US008800731B2

United States Patent
Engelmann et al.

(10) Patent No.: US 8,800,731 B2
(45) Date of Patent: Aug. 12, 2014

(54) OIL CAVITY FOR PENDULUM ELEMENT (ROLLER) OF A CENTRIFUGAL PENDULUM

(75) Inventors: Dominique Engelmann, Offendorf (FR); Markus Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 930 days.

(21) Appl. No.: 12/702,050

(22) Filed: Feb. 8, 2010

(65) Prior Publication Data
US 2010/0200347 A1 Aug. 12, 2010

(30) Foreign Application Priority Data
Feb. 9, 2009 (DE) .......................... 10 2009 007 830

(51) Int. Cl.
*F16D 57/00* (2006.01)
*F16F 15/14* (2006.01)

(52) U.S. Cl.
USPC ......................................... 188/290; 74/574.2

(58) Field of Classification Search
CPC ........... F16F 14/45; F16F 15/10; F16F 15/14; F16F 15/1442; F16F 15/145; F16F 15/16; F16F 5/161
USPC ................. 188/290, 296, 378; 464/68.2, 180; 192/55.4, 208; 74/574.2, 572.2; 60/338; 267/273
See application file for complete search history.

(56) References Cited

U.S. PATENT DOCUMENTS

| | | | | |
|---|---|---|---|---|
| 2,548,911 A * | 4/1951 | Salomon et al. | ............. | 74/574.3 |
| 3,979,804 A * | 9/1976 | McCormick | .................... | 403/34 |
| 4,537,297 A * | 8/1985 | Davies | .......................... | 192/201 |
| 5,295,411 A * | 3/1994 | Speckhart | .................... | 74/574.3 |
| 5,538,110 A * | 7/1996 | Juday et al. | .................... | 188/296 |
| 5,976,020 A * | 11/1999 | Lohaus et al. | .................... | 464/3 |
| 6,026,776 A * | 2/2000 | Winberg | .................... | 123/192.1 |
| 6,220,970 B1 * | 4/2001 | Berger et al. | ................. | 464/180 |
| 6,742,412 B2 * | 6/2004 | Feldhaus et al. | ............. | 74/574.2 |
| 8,161,740 B2 * | 4/2012 | Krause et al. | ................... | 60/338 |
| 2003/0000783 A1 * | 1/2003 | Kanai et al. | .................... | 188/378 |
| 2009/0160113 A1 * | 6/2009 | Schell et al. | .................. | 267/157 |

FOREIGN PATENT DOCUMENTS

DE 102006028556 1/2007
DE 102007024115 12/2007

* cited by examiner

Primary Examiner — Vishal Sahni
(74) Attorney, Agent, or Firm — Simpson & Simpson, PLLC

(57) ABSTRACT

A centrifugal pendulum in a torsional vibration damper of a drive train of a motor vehicle with a pendulum flange rotating about a rotation axis and several pendulum masses distributed over the circumference, disposed on the latter in a manner capable of swinging. When the internal combustion engine of the drive train induces massive rotational irregularities resulting from high vibration angles in these arrangements, the pendulum masses can be deflected more strongly relative to the pendulum flange and strike the provided swing motion limits. To prevent hard hits of the pendulum masses on the pendulum flanges, it is proposed to dampen the impact areas by hydraulic means and hence to achieve a soft impact.

8 Claims, 1 Drawing Sheet

OIL CAVITY FOR PENDULUM ELEMENT (ROLLER) OF A CENTRIFUGAL PENDULUM

CROSS-REFERENCE TO RELATED APPLICATIONS

This application claims priority from German Patent Application No. DE 10 2009 007 830.4, filed Feb. 9, 2009 which application is incorporated herein by reference in its entirety.

FIELD OF THE INVENTION

The invention relates to a centrifugal pendulum, particularly in a torsional vibration damper of a motor vehicle drive train.

BACKGROUND OF THE INVENTION

Centrifugal pendulums are known, for instance, from German application documents published prior to examination DE 10 2006 028 556 A1 and DE 10 2007 024 115 A1. In this case, for instance, a pendulum flange that can be a component of a torsional vibration damper and can feature corresponding function elements such as window cutouts for energy accumulators, can be provided with cutouts on whose races rolling elements roll, which again roll in cutouts with races on pendulum masses, which are preferably disposed on both sides of side surfaces of the pendulum flange, whereby two opposite pendulum masses are connected with one another. The form of the cutouts in the pendulum flange and in the pendulum masses determines the displacement of the pendulum masses relative to the pendulum flange. When torsional vibrations occur the pendulum masses are displaced relative to the pendulum flange and cause as a result of their pendulum movement with increasing displacement in circumferential direction and radially outwards as torsional vibration absorber.

If the vibration angle transmitted to the pendulum flange, for instance by an internal combustion engine disposed in a drive train of a motor vehicle, increases, the pendulum masses can be deflected so far that they knock on the pendulum flange. This can reduce the absorption effect of the centrifugal pendulum or even lead to a resonance, so that the deterioration of insulation behavior of the centrifugal pendulum can worsen the entire vibration behavior of the motor vehicle. Moreover, the centrifugal pendulum can be damaged.

BRIEF SUMMARY OF THE INVENTION

The object of the invention is therefore to propose a centrifugal pendulum by which the vibration behavior is improved.

The object is met by means of a centrifugal pendulum, for example, in a torsional vibration damper of a drive train of a motor vehicle with a pendulum flange rotating about a rotation axis and several restrictedly displaceable pendulum masses distributed over the circumference, limited relative to the pendulum flange within limit stops, wherein the limit stops of the pendulum masses are hydraulically dampened on the pendulum flange. Through the hydraulic dampening, hard impact of the pendulum masses is avoided. In the sense of the invention, before hard metallic impact on the pendulum flange or on the interposed components, the pendulum masses run onto an interposed buffer comprising hydraulic fluid that can be displaced with an increasing impact pressure.

In a particularly advantageous manner, hydraulic damping can be provided in arrangements in which the pendulum masses are accommodated by means of elements that roll in races formed by cutouts in both the pendulum flange and pendulum masses. Generally, in this case, the swivel paths are demarcated by limit stops of the cutouts on which the rolling elements run onto during traverse of pendulum masses relative to the pendulum flange. In the process, the rolling elements can run on the corresponding limit stops in the circumferential direction on both sides of the cut outs in the pendulum flange as well as in the pendulum masses. It is therefore proposed for such exemplary embodiments, in the section of at least a limit stop, however, preferably on all limit stops in connection with the associated rolling element, to form a chamber with a gap that is at least partially filled with hydraulic fluid, so that when a rolling element approaches the limit stop, the chamber is formed and upon further approach of the rolling element to the limit stop, the hydraulic fluid trapped inside the chamber is squeezed out through the gap formed between the rolling element and the cutout. In this manner, resistance develops over the remaining traverse up to the hard impact, which prevents hard impact of the pendulum mass against the pendulum flange or if applicable prevents an impact entirely.

In accordance with an advantageous exemplary embodiment, a sack-shaped recess can be provided by the cutout in the limit stop area, which will be partially closed upon attaining a predetermined proximity of the rolling element on the limit stop from the circumference of the rolling element by forming two gaps.

To further seal the preferably disc-shaped components, at least partially on their sides, namely pendulum flange and pendulum masses, and hence prevent the leakage of hydraulic fluid without resistance, a chamber provided in the cutout of the pendulum flange can at least be closed partially on the face sides of the pendulum flanges, by means of a ring board disposed respectively on the rolling element. For instance, two axially displaced ring boards of a barrel-shaped rolling element slides along the side surfaces of the pendulum flanges, whereby they are radially extended such that they flatly cover the rolling elements when approaching the rolling element on the chamber. The ring board, at the same time, can serve for axial stabilization of the rolling element in the cutout.

In the same manner, the ring board, at least partially, can close a chamber provided in the cutout of a pendulum mass, on the side of the pendulum mass facing the pendulum flange, whereas the side of the pendulum mass facing away from the pendulum flange can be closed preferably by shutter at least partially. In the process, the distances of ring collars from the side surfaces of pendulum masses or rather of the pendulum flange and/or the shutter likewise feature clearance from the side surfaces, so that, under pressure, hydraulic fluid can escape from this point.

To supply the hydraulic fluid contained in the chamber formed in this manner, the centrifugal pendulum is preferably operated in a wet environment. For this purpose, the centrifugal pendulum can be encapsulated in dry environments. It has proven particularly advantageous when the centrifugal pendulum is used in a casing of a torque converter or a wet clutch, so that the hydraulic fluid can suffice as converter fluid or clutch fluid.

The invention likewise comprises a torsional vibration damper with a centrifugal pendulum of the type described above, wherein this is formed by an input part and an output part that is rotatable relative to the latter against the effect of the energy accumulator and can feature several damper stages. The centrifugal pendulum can be integrated in a disc part of a damper stage, for instance in the input or output part.

In the same manner, the inventive concept comprises a torsional vibration damper torque converter with housing at least partially filled with a hydraulic fluid, which, with the latter, contains a centrifugal pendulum formed according to the inventive idea or rather the torsional vibration damper.

BRIEF DESCRIPTION OF THE SEVERAL VIEWS OF THE DRAWING

The invention is illustrated in detail, based on the exemplary embodiments depicted in FIGS. 1 and 2. The figures show the following.

DETAILED DESCRIPTION OF THE INVENTION

Figure 1:
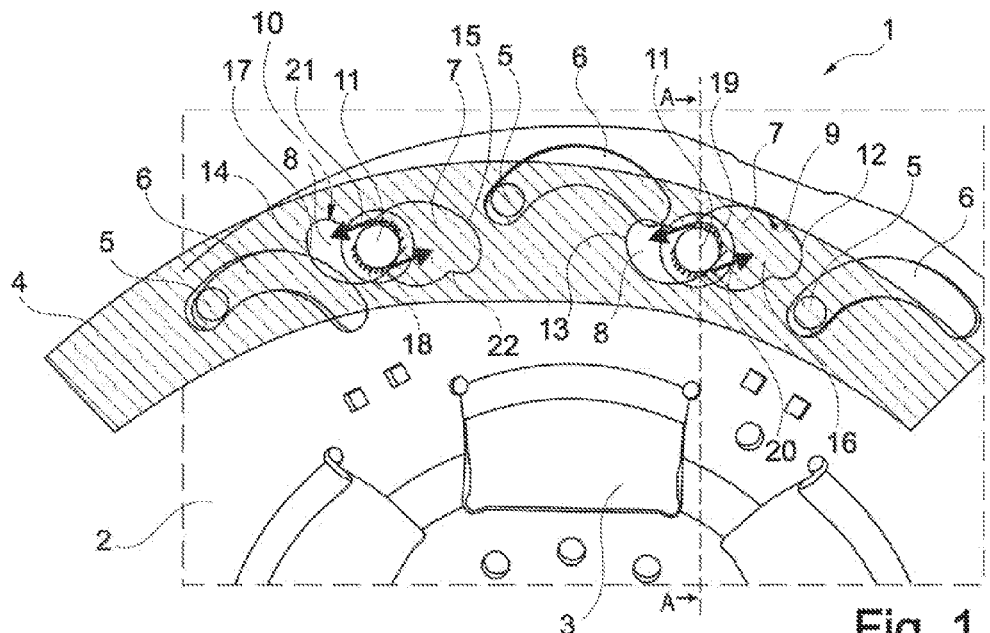
FIG. 1 is a front view section of a centrifugal pendulum.

FIG. 1 shows a section of a centrifugal pendulum 1. The basic structure of centrifugal pendulum and torsional vibration dampers, for instance, can be derived from DE 10 2006 028 556 A1. The centrifugal pendulum 1 is formed out of the pendulum flange 2, which as a functional component of a torsional vibration damper contains window-shaped cutouts 3 for receiving or pressurizing energy accumulators acting in circumferential direction and can serve as the disc part for a torsional vibration damper.

Radially outside the cutouts 3 are pendulum masses 4 distributed over the circumference in a manner capable of swinging, and said masses 4 are accommodated on the pendulum flange 2, one on either side of the pendulum flange 2, and are connected rigidly with one another by means of a connection means 5 like bolts or rivets. The pendulum flange 2 is provided with through-punches 6, through which the connection means are guided and their form corresponds to the swing range of the pendulum masses 4.

The form of swing range of the pendulum masses 4 relative to the pendulum flange 2 is determined by the cutouts 7, 8 both in the pendulum flange 2 as well as in the pendulum masses 4, in which the rolling elements 11 roll on the races 9, 10. To limit the swing range, the centrifugal pendulum in an ideal case, for instance, can be dimensioned through the gradient of the races 9, 10, the mass of the pendulum masses 4, their disposition diameter and the like, so that within the resulting swing angle in the centrifugal pendulum 1, collision of the rolling element on the circumferential limit stops 12, 13 of the cutouts 7 of the pendulum flanges 2 or on the limit stops 14, 15 of the cutouts 8 of the pendulum masses is improbable.

Should hard impact of the rolling element 11 on the limit stops 12, 13, 14, 15 threaten to occur, for instance, at high vibration angles, then this will be dampened by hydraulic damping of the pendulum masses 4 relative to the pendulum flange. For this purpose, the cutouts 7, 8 feature sack-like extensions 16, 17 on both sides in the circumferential direction, which when the rolling element 11 approaches the limit stops 12, 13, 14, 15 with the rolling elements 11, form a chamber 18, 19 in which a hydraulic fluid is present, which is squeezed out through the gaps formed between the rolling elements 11 and the extensions 16, 17 when the rolling element 11 owing to its approach towards the limit stops 12, 14 the volume of the chamber 18, 19 reduces in the one swing direction or on the limit stops 13, 15 in the other swing direction. When the rolling element 11 approaches the limit stops 12, 13, 14, 15 the hydraulic fluid will be squeezed out in the direction of the arrows 20, 21. To form a suitable gap between the rolling elements 11 and the extensions 16, 17, the cutouts 7, 8 can feature corresponding noses 22.

Filling the chamber 18, 19 anew with hydraulic fluid can, for instance, occur by means of the centrifugal influence of the hydraulic fluid, in that the centrifugal pendulum 1, for instance, in an application in a hydraulic torque converter, surrounds a wet clutch or through a corresponding encapsulation of the centrifugal pendulum-type absorber. It is obvious that this apparatus for hydraulic damping can be provided alternatively also exclusively on the cutouts 7 of the pendulum flanges 2 or on the cutouts 8 on the pendulum masses 4. Moreover, such a damping apparatus cannot be provided on all cutouts 7, 8.

In order to seal the chambers 18, 19 on the side surfaces of the pendulum flanges 2, at least so far that during the approach by the rolling element 11 to the limit stops 12, 13, 14, 15 hydraulic damping can be attained, a ring board 23 is provided on the rolling elements 11 on both side surfaces of the pendulum flange 2, which, relative to the rolling diameter of the rolling element 11, is radially expanded such that it radial surrounds the radial extension of the chambers 18, 19. Ring board 23 extends from rolling element 11 in a direction orthogonal to rotation axis AR for rolling element 11. Line L1, parallel to axis AR, passes through the pendulum masses 4, gaps 26, and pendulum flange 2. In the same manner, this ring board 23 also seals the side surface of the chamber 19 of the pendulum masses 4 facing the pendulum flange 2. The side surface of the chamber 19 facing away from the pendulum flange 2 is sealed by a shutter not depicted.

Figure 2:
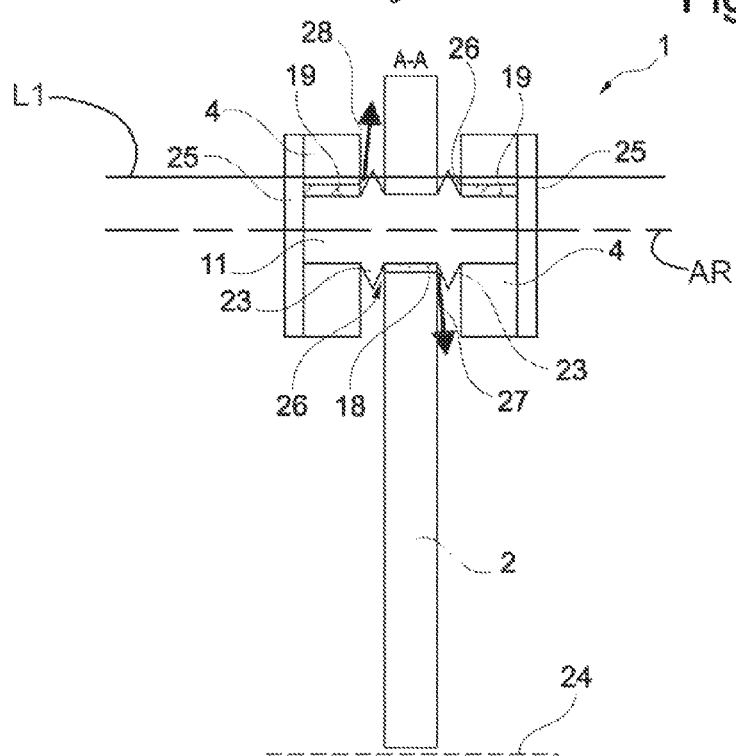
FIG. 2 is a section through the centrifugal pendulum of FIG. 1 along the section line A-A.

FIG. 2 shows centrifugal pendulum 1 depicted in FIG. 1 along the section line A-A. The depicted chambers 18, 19 of the pendulum flange 2 or the pendulum masses 4 are derived from this chamber—illustrated in hatches. To depict hydraulic damping, adequate sealing of the chambers 18, 19 against the axial side surfaces of the pendulum flanges 2 is based on the rotation axis 24 of the centrifugal pendulum-type absorbers 1 and the pendulum masses 4 by means of the ring board 23 of the rolling element 11 or shutter 25. Thus, the shutters 25 can close the chamber 19 tightly, whereas the ring board 23 forms the gap 26 at the point of arrows 18, 19, through which the fluid can escape during the approach of the rolling element 11 to the limit stops 12, 13, 14, 15 (FIG. 1) in addition to the gaps in the direction of arrows 20, 21 (FIG. 1) are those in the direction of arrows 27, 28.

LIST OF REFERENCE SYMBOLS 1 centrifugal pendulum
2 pendulum flange
3 cutout
4 pendulum masse
5 connecting means
6 opening
7 cutout
8 cutout
9 race
10 race
11 rolling element
12 limit stop
13 limit stop
14 limit stop
15 limit stop
16 extension
17 extension
18 chamber
19 chamber
20 arrow
21 arrow
22 nose 23 ring board
24 rotation axis
25 shutter
26 gap
27 arrow
28 arrow

What we claim is:

1. A centrifugal pendulum (1) in a torsional vibration damper of a drive train of a motor vehicle with:
   a pendulum flange (2) rotatable about a first rotation axis (24) and including:
      a first plurality of cutouts; and
      first and second cutouts separate from the first plurality of cutouts;
   first and second restrictedly displaceable pendulum masses distributed over a circumference, the first pendulum mass disposed on a first side of the pendulum flange and the second pendulum mass disposed on a second side of the pendulum mass, opposite the first side;
   third and fourth cutouts in the first pendulum mass;
   fifth and sixth cutouts in the second pendulum mass;
   a plurality of connectors, each connector:
      passing through a respective cutout from the first plurality of cutouts and rigidly connected to the first and second pendulum masses;
   a first rolling element:
      passing through the first cutout with respective first and second ends disposed within the third and fifth cutouts and including:
         a second rotation axis passing through the respective first and second ends of the first rolling element;
         a first ring board:
            extending from the first rolling element in a first direction orthogonal to the second rotation axis;
            located between the pendulum flange and the first pendulum mass in an second direction parallel to the second rotation axis; and,
            aligned with the first and third cutouts in the second direction;
         a second ring board:
            extending from the first rolling element in the first direction;
            located between the pendulum flange and the second pendulum mass in the second direction; and,
            aligned with the first and fifth cutouts in the second direction;
   a first gap, in the second direction, located between the first ring board and the first pendulum mass;
   a second gap, in the second direction, between the second ring board and the second pendulum mass; and,
   a second rolling element passing through the second cutout with respective first and second ends disposed within the fourth and sixth cutouts, wherein:
      the first and second rolling elements are displaceable with respect to the flange and the first and second pendulum masses;
   a line, in the second direction, passes through the first and second pendulum masses, the first and second gaps, and the pendulum flange;
   a first limit stop forms, with the first rolling element, a first chamber at least partially filled with hydraulic fluid;
   second and third limit stops for the third cutout form, with the first rolling element, second and third chambers at least partially filled with hydraulic fluid; and,
   the first, second, and third chambers are at least partially sealed by the first ring board.

2. The centrifugal pendulum (1) according to claim 1, wherein:
   the first rolling element rolls in respective races formed by the first, third, and fifth cutouts; and,
   the second rolling element rolls in respective races formed by the second, fourth, and sixth cutouts.

3. The centrifugal pendulum (1) according to claim 2, wherein, in a circumferential direction:
   the first cutout is limited by the first limit stop and a fourth limit stop;
   the second cutout is limited by fifth and sixth limit stops;
   the third cutout is limited by the second and third limit stops;
   the fourth cutouts is limited by seventh and eighth limit stops;
   the fifth cutout is limited by ninth and tenth limit stops; and,
   the sixth cutout is limited by eleventh and twelfth limit stops.

4. The centrifugal pendulum (1) according to claim 1, wherein the first, second, and third chambers are partially closed by a circumference of the first rolling element.

5. A torsional vibration damper with a centrifugal pendulum (1) according to claim 1.

6. A hydrodynamic torque converter with a housing at least partially filled with hydraulic fluid and a centrifugal pendulum (1) accommodated in the latter according to claim 1.

7. The centrifugal pendulum (1) according to claim 1, wherein movement of the first and second rolling element elements with respect to the flange and the first and second pendulum masses is hydraulically dampened.

8. The centrifugal pendulum according to claim 1, further comprising:
   a first shutter:
      connected to a side of the first pendulum mass facing away from the flange in the second direction;
      displaceable with respect to the pendulum flange; and
      closing the third cutout with respect to the first pendulum mass; and,
   a second shutter:
      connected a side of the second pendulum mass facing away from the flange in the second direction;
      displaceable with respect to the pendulum flange; and
      closing the fifth cutout with respect to the second pendulum mass.

* * * * *